United States Patent Office 3,468,969
Patented Sept. 23, 1969

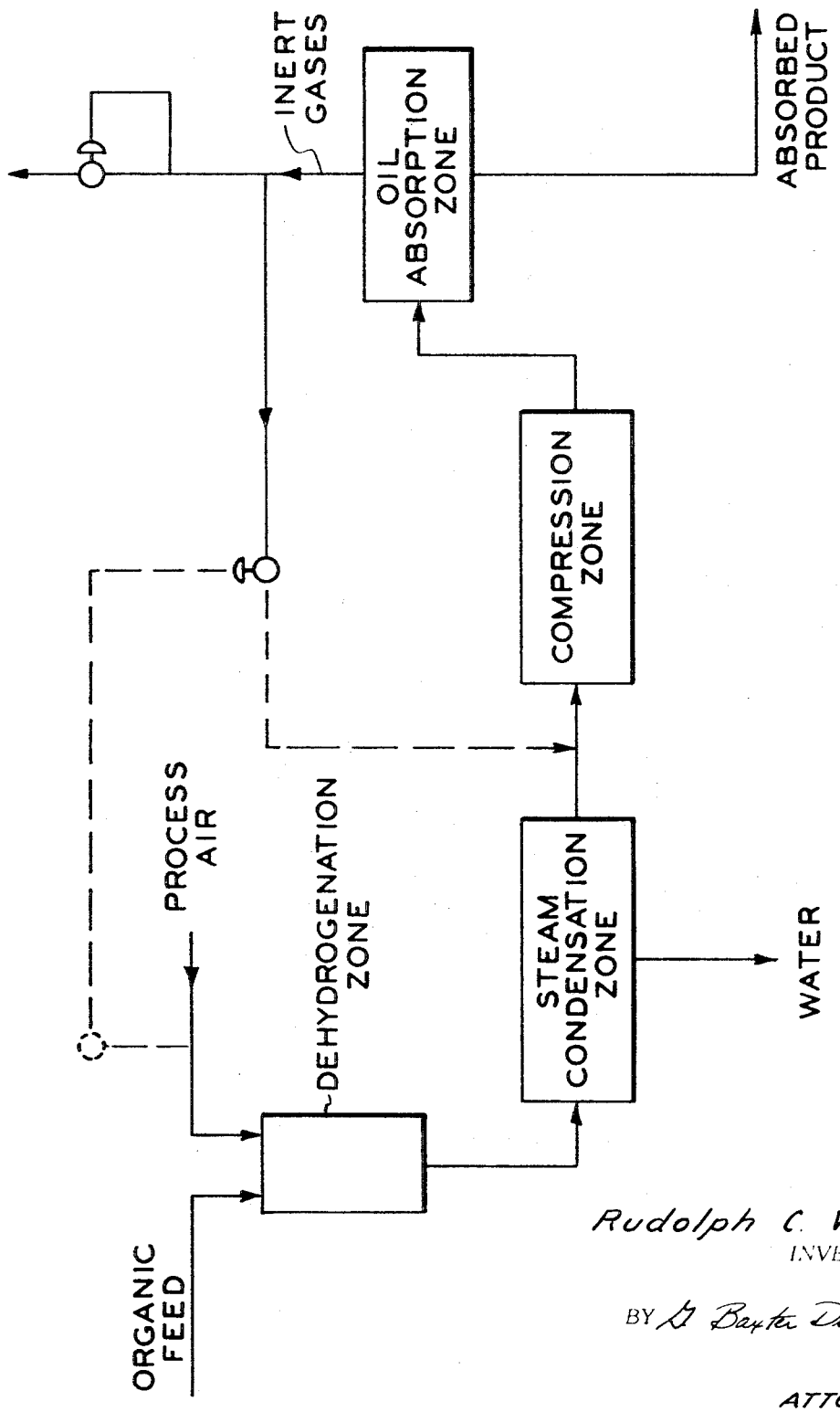

3,468,969
DEHYDROGENATION PROCESS
Rudolph C. Woerner, Houston, Tex., assignor to Petro-Tex Chemical Corporation, Houston, Tex., a corporation of Delaware
Filed July 26, 1966, Ser. No. 567,858
Int. Cl. C07c *11/12, 5/18;* C07b *3/00*
U.S. Cl. 260—680                7 Claims

ABSTRACT OF THE DISCLOSURE

Organic compounds are dehydrogenated by a process which comprises (1) feeding oxygen and an organic compound to be dehydrogenated to a dehydrogenation zone to form a dehydrogenation zone effluent comprising unsaturated organic compound and noncondensable gases, (2) cooling the dehydrogenation zone effluent in a cooling zone, (3) compressing the cooled effluent in a compression zone, (4) absorbing the compressed effluent in an oil absorber to absorb the unsaturated organic compound in the oil and release an absorber overhead gas, the improvement which comprises feeding the said absorber overhead gas to the zone between the said cooling zone and the suction side of the compression zone in response to the rate of flow of oxygen to the dehydrogenation zone.

---

This application relates to a process for the production of unsaturated organic compounds by dehydrogenation. More particularly, it relates to a process for dehydrogenation in the presence of oxygen and a process for the recovery of the unsaturated products so produced.

Unsaturated organic compounds such as vinyl chloride, acrylonitrile, styrene, vinyl acetylene, butene, butadiene, isoprene and the like are produced by the catalytic dehydrogenation of more saturated compounds. Improved processes have recently been developed whereby higher conversions, yields and selectivities of products are obtained by the dehydrogenations in the presence of oxygen and suitably a halogen. These processes are suitably referred to as oxidative dehydrogenations.

One of the prior art difficulties in conducting oxidative dehydrogenations is in maintaining balanced process conditions between the dehydrogenation zone and the recovery zones. This is particularly true if there is an upset or failure in any portion of the dehydrogenation process. One such difficulty occurs when the oxygen to the dehydrogenation zone is diminished or omitted. When this occurs the pressure of the gaseous system downstream from the dehydrogenation zone is thrown out of balance. Although this situation can be remedied by accordingly adjusting pressures downstream, such adjustment of pressures is time-consuming and often there is not enough time available for the adjustment. If the adjustments are not made in sufficient time, damage to personnel and equipment may likely result. A process for coping with this problem has now been discovered.

According to this invention, organic compounds are dehydrogenated by a process which comprises (1) feeding oxygen and an organic compound to be dehydrogenated to a dehydrogenation zone to form a dehydrogenation zone effluent comprising unsaturated organic compound and noncondensable gases, (2) cooling the dehydrogenation zone effluent in a cooling zone, (3) compressing the cooled effluent in a compression zone, (4) absorbing the compressed effluent in an oil absorber to absorb the unsaturated organic compound in the oil and release an absorber overhead gas, the improvement which comprises feeding the said absorber overhead gas to the zone between the said cooling zone and the suction side of the compression zone in response to the rate of flow of oxygen to the dehydrogenation zone.

For purposes of explanation, an example of the invention is illustrated by the drawing. Organic compound to be dehydrogenated is fed as organic feed to a dehydrogenation zone. Process air is also fed to the dehydrogenation zone as a source of oxygen. The dehydrogenation zone effluent is cooled and water is removed in a steam condensation zone (cooling zone) and the resultant gaseous phase is compressed in a compression zone. After compression the desired dehydrogenated product is separated by absorption in oil in an oil absorption zone such as an oil absorber. Unabsorbed gases such as nitrogen and $CO_2$, referred to as inert gases, are taken off overhead from the absorber. If there is a predetermined loss of process air, the motor valve in the line connecting the overhead from the oil absorption zone and the line upstream from the compressors is automatically opened to allow the inert gases to flow to the system upstream of the compressors. Thus, the compressors do not pull a vacuum on the upstream system.

The organic compound to be dehydrogenated is contacted with oxygen in a dehydrogenation zone normally in the presence of solid catalysts and suitably a halogen. Examples of processes for dehydrogenation in the presence of oxygen are found in U.S. Patents 3,207,805 through 3,207,811, U.S. 3,205,280, Example I of U.S. 3,159,688 and according to U.S. 3,080,435 wherein a molten salt reactor containing a metallic iodide is employed. A suitable source of halogen is from ammonium halide as disclosed in U.S. 3,207,805.

The process of this invention can be applied to a great variety of organic compounds to obtain the corresponding unsaturated derivative thereof. Such compounds normally will contain from 2 to 20 carbon atoms, preferably from 2 to 8 carbon atoms, at least one

grouping, i.e., adjacent carbon atoms each containing at least one hydrogen atom, a boiling point below about 350° C., and such compounds may contain in addition to carbon and hydrogen, oxygen, halogens, nitrogen and sulphur. Among the classes of organic compounds which are dehydrogenated by means of the novel process of this invention are alkanes, alkenes, alkyl halides, ethers, esters, aldehydes, ketones, organic acids, alkyl aromatic compounds, alkyl heterocyclic compounds, cyanoalkanes, cycloalkanes and the like. Illustrative applications include ethylbenzene to styrene, isopropylbenzene to α-methyl styrene, ethylcyclohexane to styrene, cyclohexane to benzene, ethane to ethylene, propane to propylene, propane to propadiene, isobutane to isobutylene, n-butane to butene and butadiene, butene to butadiene, 2-methylbutene-1 to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine and the like. Other representative materials which are readily dehydrogenated in the novel process of this invention include ethyl toluene, the alkyl chlorobenzenes, ethyl naphthalene, isobutyronitrile, propyl chloride, isobutyl chloride, ethyl fluoride, butyl chloride, the chlorofluoroethanes, methyl ethyl ketone, diethyl ketone, methyl propionate, and the like. This invention is particularly useful in the preparation of vinylidene compounds containing at least one $CH_2=C<$ group, that is a compound possessing at least one group containing a terminal methylene group attached by a double bond to a carbon atom, and 2 to 12 carbon atoms.

A preferred class of compounds to be dehydrogenated is hydrocarbons, such as those having from 2 to 8 carbon atoms. Excellent results have been obtained with acyclic aliphatic compounds of 4 to 5 or 6 carbon atoms wherein the compound has a straight chain of at least 4 carbon atoms. Included in this definition are such compounds as n-butane, n-butene-1 or -2, methyl pentene, methyl pentane and mixtures thereof. For example, n-butane, n-butene-1, n-butene-2 or mixtures thereof may be dehydrogenated to produce butadiene-1,3 which has many wellknow commercial uses such as for polymerization to produce polybutadiene.

The quantity of oxygen will normally be present in an amount of at least 0.2 mol per mol of organic compound to be dehydrogenated. A usual range is from 0.2 to 2.5 mols of oxygen per mol of organic compound and a preferred range is from 0.3 to 2.0 mols per mol. The oxygen may be added as such, or as air, as air enriched with oxygen, or the oxygen may be diluted with diluents such as nitrogen, helium, argon and the like. The preferred source of oxygen is air or air enriched with oxygen. The oxygen may be introduced in any manner to the dehydrogenation zone.

The halogens employed, if any, will preferably be iodine, bromine or chlorine, and the form of the halogens may be the halogens themselves or any halogen-containing materials which liberate free halogen under the conditions of the reaction as defined hereinafter. For example, chlorine, bromine and iodine; hydrogen chloride, hydrogen bromide and hydrogen iodide; the alkyl halides such as alkyl iodides and bromides wherein the alkyl groups preferably contain 1 to 6 carbon atoms; ammonium halies including ammonium chloride, ammonium bromide, ammonium iodide and ammonium fluoride; and mixtures of these may also be employed. The halogens, hydrogen halides, ammonium halides and alkyl halides wherein the alkyl groups contain 1 to 5 carbon atoms, have been found to be particularly useful in the practice of this invention. Any suitable combination of reactants may be used as chlorine and hydrogen bromide; chlorine and bromine; hydrogen chloride and bromine; chlorine and hydrogen iodide, bromine and iodine and the like added together or separately.

The total amount of halogen use may be varied quite widely, usually an amount greater than 0.001 mol of halogen per mol of organic compound to be dehydrogenated. More usually, at least about 0.005 mol of total halogens per mol of organic compound will be employed. Large amounts of halogens may be used, as high as one-half to one mol or more per mol of organic compound to be dehydrogenated if desired, but generally only very small amounts of halogens are used, normally less than about 0.2 mol total of halogens, per mol of organic compound to be dehydrogenated. Economic and process considerations will normally dictate the exact amount of halogens to be employed.

According to this invention preferably at least two mols of inert noncondensable gases are fed to the dehydrogenation zone per mol of organic compound to be dehydrogenated. The term "inert noncondensable gases" is defined to mean gases which under the conditions of dehydrogenation and recovery do not react to form a different compound(s) and which also do not condense under the conditions of the process. Examples of inert noncondensable gases are nitrogen, argon, helium, carbon dioxide, hydrocarbons which are not converted in the process and the like. Larger quantities of inert noncondensable gases may be fed such as from 2 to 20 mols per mol of organic compound to be dehydrogenated. Generally the ratio will be from 3 to 15 mols per mol of organic compound.

In addition to the inert noncondensable gases the feed to the dehydrogenation zone may suitably contain steam such as from about 1 to 25 mols of steam per mol of organic compound.

The dehydrogenation reaction may be conducted in the absence of contact catalysts, but better results are obtained if the reaction is conducted in the presence of metal or metal compound catalysts. The dehydrogenation reactor may be a fixed or fluid bed reactor. Reactors such as those conventionally used for the dehydrogenation of hydrocarbons to butadiene may be employed. The total pressure in the dehydrogenation zone may suitably be about atmospheric pressure. However, higher pressures or vacuum may be used. Pressures such as from about atmospheric (or below) up to about 100 to 200 p.s.i.g. may be employed. The dehydrogenation reaction will normally be conducted at a temperature of reaction between about 600° F. to about 1500° F. or higher although generally the maximum temperature in the reactor will be within the range of about 700° F. and 1300° F. This temperature of the reaction is measured at the maximum temperature in the reactor. The flow rates of the reactants may be varied quite widely and will be dependent somewhat on whether fixed or fluid bed reactor is employed. Good results have been obtained with flow rates of the hydrocarbon to be dehydrogenated ranging from about ¼ to 25 liquid volumes of hydrocarbon to be dehydrogenated per volume of reactor zone per hour, with the volumes of hydrocarbon being calculated as the quivalent amount of liquid hydrocarbons at standard conditions of 15.6° C. and 760 millimeters of mercury absolute. For the purpose of calculating flow rates the reaction zone is defined as the portion of the reactor which contains catalyst and which is at a temperature of at least 600° F. In other words, the volume of the reaction zone is equivalent to the volume of the catalyst zone if it were empty. The residence or contact time of the reactants in the dehydrogenation zone depends on several factors involved in the reaction. Contact times such as about 0.001 to about 5, 10 or 25 seconds have been found to give excellent results. Under certain conditions, higher contact times may be utilized. Contact time is the calculated dwell time of the reaction mixture in the reaction zone assuming the mols of product mixture are equivalent to the mols of feed.

Metal or metalloids and compounds thereof may be employed in the dehydrogenation zone as catalysts. These catalysts may be present as either fluid beds or as fixed beds. The metals and metalloids are found in the Periodic Table Groups 1a, 2a, 3b, 4b, 5b, 6b, 7b, 8, 1b, 2b, 3a, 4a, 5a and mixtures thereof. The Periodic Table referred to is that on the back cover of the 45th edition (1964–65) of the Handbook of Chemistry and Physics (The Chemical Rubber Co., Cleveland, Ohio). The metal or metalloid may be present as such or as inorganic compounds such as oxides, hydroxides or salts (e.g. chlorides, bromides, iodides, sulfates, phosphates and so forth). Precursors of these compounds may be employed. For example, a metal acetate may decompose in the dehydrogenation zone to the corresponding oxide.

A particularly useful class of catalysts is that wherein one or more transition metal compound (metals of Groups 3b, 4b, 5b, 6b, 7b, 8, 1b, 2b) is combined in major proportion with one or more metal compounds of Group 1a or 2a. Preferably the transition metal will comprise iron and also preferably the catalyst will have iron as the major metal element present by weight percent.

Inorganic metal compounds which are useful in the dehydrogenation zone of this invention include potassium carbonate, magnesium phosphate, magnesium silicate, barium carbonate, barium sulfate, calcium silicate, calcium carbonate, sodium chloride, lanthanum oxide, titanium oxide, zirconium oxide, vanadium pentoxide, tantalum oxide, columbium oxide, chromic oxide, molybdenum oxide, manganese oxide, manganese phosphate, lithium phosphate, iron oxide, iron phosphate, cobalt oxide, iron phosphide, nickel oxide, iron carbonate, iron sulfate, copper oxide, zinc oxide, aluminum oxide, aluminum silicate, tin oxide, lead oxide, antimony oxide, bismuth oxide, bismuth phosphate, bismuth hydroxide, tungstic acid, manganous chloride, zinc sulfate, potassium phosphate, sodium fluoride, calcium nickel phosphate, vanadium oxyphosphate, molybdenum antimonate, molybdenum phosphate, calcium fluoride and the like.

The following combinatioins are useful: cerium oxide and calcium oxide, cerium oxide and magnesium oxide, cerium oxide with magnesium oxide and calcium oxide, cerium oxide and potassium hydroxide, cerium oxide and sodium hydroxide, cerium oxide and lithium hydroxide, cerium oxide and barium oxide, cerium oxide and barium hydroxide, cerium oxide and strontium hydroxide, zirconium oxide and lithium hydroxide, iron oxide and lithium hydroxide, manganese dioxide and lithium hydroxide, manganese phosphate and lithium hydroxide, titanium oxide and lithium hydroxide, zinc oxide and barium hydroxide, mangesium oxide and calcium hydroxide, lithium hydroxide and barium hydroxide, vanadium pentoxide and lithium hydroxide, chromic oxide and barium hydroxide, bismuth oxide and lithium hydroxide, ferric oxide plus lithium hydroxide and barium hydroxide, and the like as disclosed herein. The catalysts may be employed as such or carriers and supports may be used.

The effluent from the dehydrogenation zone will contain the impure unsaturated organic products, various impurities such as oxygenated compounds, inert noncondensable gases and depending upon the particular process, perhaps some unconverted feed or halogenated compounds. If air was used as the source of oxygen, nitrogen will be present in relatively large quantities as a noncondensable gas. Steam may be present in an amount up to 96 mol percent of the total effluent, such as from 5 to 96 mol percent.

The effluent gases leaving the dehydrogenation zone will generally be at a temperature of about or greater than 600° F. or 700° F. to 1600° F. depending upon the particular dehydrogenation process. The effluent gases are then cooled. The reactor effluent may be cooled in a cooling zone by any means or combination of means as by quenching followed by employing waste heat boilers, condensers, vapor separators and the like. Water will be removed as condensed steam from the gaseous effluent during this cooling operation. This cooled gaseous stream will contain, e.g., from 10 to 50 mol percent of the dehydrogenated organic compound based on the total gases at that point.

The gaseous stream may be processed at any stage to remove carbonyl compounds or halogenated compounds such as by the method of U.S. 3,200,166.

The cooled gases from which water has been condensed is conducted to the compression zone. Conventional mechanical compressors may be employed to compress the gases. The zone between the cooling zone and the compression zone is connected to the gaseous overhead from the oil absorber. The flow of gases from the absorber overhead to the zone between the cooling and compression zone may be controlled by any means such as by a motorized valve. This flow is controlled in response to the flow of oxygen to the dehydrogenation zone. Maximum flow of absorber overhead gases would be achieved when there is essentially no flow in the inlet oxygen line to the dehydrogenation zone. On the other hand, the flow from the absorber overhead would be at a minimum or nil when the normal quantity of oxygen is being fed to the dehydrogenation zone. Any intermediate rate of flow of absorber gases in response to the flow of oxygen to the dehydrogenation zone is also possible.

A feature of this invention lies in the indirect control of the flow of absorber overhead gases in response to a diminished flow of the organic compound to be dehydrogenerated to the dehydrogenation zone. According to this procedure the flow of oxygen to the dehydrogenation zone is reduced or eliminated when the flow of the organic compound is correspondingly reduced or eliminated. Thus, according to this feature, e.g., if there ceases to be a flow of organic compound to the dehydrogenation zone the oxygen to the dehydrogenation zone is shut off in response thereto and the absorber overhead gases are fed to the zone between the cooling zone and the compression zone.

Means well known to those skilled in the art may be employed to regulate and control the flow of the respective gases. Preferably the flow of absorber overhead gases will automatically be controlled in response to the flow of oxygen to the dehydrogenation zone. The flow of absorber overhead gases can be actuated either only when the flow of oxygen to the dehydogenation zone is essentially or completely eliminated or may be actuated when the flow of oxygen has reached a preset minimum level. The flow may be regulated to approximate an inverse ratio of the flow of oxygen. If necessary or desirable, the absorber overhead gases may be supplemented by other relatively inert gases such as natural gas.

Conventional compressors and oil absorbers may be employed. Any satisfactory lean oil may be employed that will absorb the unsaturated organic compound. The oil may be, e.g., paraffinic or aromatic. The lean oil of the oil absorber may, for example, be made up of compounds having elements selected from the group consisting of carbon, hydrogen, oxygen, nitrogen, halogen, and mixtures thereof and will preferably consist essentially of these elements. Of course, the lean oil may contain impurities, particularly after the process has been in operation for a period of time. Particularly preferred as lean oils are hydrocarbons which have the formula $C_xH_y$, wherein $x$ is a number from 6 to 9 inclusive and $y$ is a number from 6 to 18 inclusive; suitable compounds to be used as lean oils are methylcyclohexane, 2,4,4-trimethyl-1-pentene, 3,4,4-trimethyl-1-pentene, 2,4,4-trimethyl-2-pentene, 3,3,4-trimethyl-1-pentene, 2,3,4-trimethyl-1-pentene, 2,3,3-trimethyl-1-pentene, 2,5-dimethylhexane, 2,4-dimethylhexane, 2,2,3-trimethylpentane, benzene, toluene, 3,4,4-trimethyl-2-pentene, 2,3,4-trimethylpentane, 2,3,3-trimethylpentane, 2,3,4-trimethyl-2-pentene, butadiene dimer, diisobutylene, paraffins containing 8 carbon atoms, such as those obtained from an alkylation plant, amylamine, 3-chloropentane, n-butylamine, m-dioxane, nitro-ethane, mixtures thereof, and the like. The lean oil may, e.g. have a boiling point at standard atmospheric pressures of from about 170° F. to 320° F., and excellent results have been obtained with lean oils predominately having a boiling range of about 175° F. to 280° F.

The absorber may be operated under any conditions to achieve the desired absorption and overhead gas. One satisfactory condition for operation of the absorber is that wherein the temperature is of from about 40° F. to 200° F. and, more desirably, within the range of 60° F. to 150° F. Also, for example, the pressure in the absorber may be, e.g. from 80 p.s.i.g. to 220 p.s.i.g. and more desirably, from 100 p.s.i.g. to 200 p.s.i.g.

The fat oil may be stripped in conventional manner to separate the unsaturated organic compounds. The organic composition stripped from the absorber oil is then further purified, e.g. as by fractional distillation.

EXAMPLE 1

An example of the invention is illustrated with a process for the dehydrogenation of a mixture of n-butene and n-butane to butadiene-1,3 using a bromine catalyst. The hydrocarbon mixture is fed to a fixed bed reactor containing a cerium oxide catalyst. The feed to the reactor contains oxygen fed as air in an amount of 0.70 mol of oxygen per mol of hydrocarbon. The bromine catalyst is fed as ammonium bromide in an amount equivalent to 0.020 mol of $Br_2$ per mol of hydrocarbon. The maximum bed temperature of the reactor was about 1240° F. The rate of feed of hydrocarbon is equivalent to a flow rate of hydrocarbon of 0.80 liquid hourly space velocity (liquid volumes of hydrocarbon per volume of reactor packed with catalyst per hour). The reactor feed contains 11 mols of steam per mol of hydrocarbon. The pressure of the inlet gases is about 6 p.s.i.g. Excluding the water, the effluent from the reactor contains on a mol percent basis, about 77 mol percent noncondensable (under the conditions of recovery) or "fixed" gases, four percent unreacted butene, 16 percent butadiene and 0.4 mol percent ammonium bromide. The remainder is composed of oxygen and oxygenated hydrocarbons, saturated hydrocarbons such as n-butane, olefins such as ethylene and isobutylene, and acetylenic hydrocarbons. The effluent also contains the 11 mols of steam per mol of hydrocarbon fed to the reactor together with steam formed during the reaction. Approximately ½ mol of steam is formed in the reaction per mol of hydrocarbon fed to the reactor. The effluent gases leaving the dehydrogenation zone are at a temperature of about 1240° F. and are at a pressure of about 5 p.s.i.g. The effluent gases are quenched by spraying the effluent gases with water of a temperature of about 122° F. The quenched gases are then further cooled and thereafter further quenched by spraying the gases with an aqueous ammonium bromide solution of 32 weight percent ammonium bromide concentration. The gases are then fed to spray towers and vapor separators where approximately 97 mol percent of the total water in the effluent gases is removed as condensate. The gaseous phase is conducted to the suction side of the compressors. In this line between the condensers and the suction side of the compressors is connected a line from the overhead from the oil absorber (described hereafter). The compressed gases are cooled and fed to an oil absorber. The absorber is a tray type column absorber with the gaseous feed entering the bottom of the absorber and the lean oil being fed to the top of the column. The absorber is operated at a bottoms temperature of about 130° F. and an overhead temperature of 80° F. with the pressure being about 125 p.s.i.g. The lean oil has a boiling point of from about 230 to 260° F. The noncondensed and unabsorbed gases are taken overhead. From the overhead line from the oil absorber is conducted a line to the line mentioned above between the condensers and the compressor suction.

The flow of air to the dehydrogenation reactor is metered by a flow meter, and when the air flow rate falls below 60 volume percent of the 0.7 mol of oxygen per mol of hydrocarbon an electrical signal will be activated which causes a valve to start opening in the line from the absorber overhead to the line between the condensers and the compressor suction.

EXAMPLE 2

The general procedure for Example 1 is repeated with certain exceptions. No halogen is fed to the dehydrogenation reactor. The dehydrogenation catalyst comprises iron oxide. n-Butene-2 (92 mol percent with the remainder containing n-butane, butadiene-1,3 and $C_5$ hydrocarbons) is fed at a rate of 2.75 liquid hourly space velocity and at an inlet temperature of about 725° F. The maximum temperature in the bed is about 1200° F. Oxygen is fed as air in an amount of .66 mol per mol of hydrocarbon. The yield of butadiene-1,3 is 58 mol percent. The effluent gases are treated generally as in Example 1. However, the flow of air to the dehydrogenation reactor is regulated in response to the flow of the hydrocarbon to the dehydrogenation reactor. The flow of absorber overhead gases is in turn regulated in response to the flow of the air to the reactor. In this example, the system is actuated by a flow of 50 volume percent or less than the 2.75 liquid hourly space velocity.

EXAMPLE 3

The procedure of Example 2 is generally repeated with the butene-2 being replaced with a mixture of approximately 70 mol percent 2-methyl pentene-1 and 28 mol percent 2-methyl pentane. The liquid hourly space velocity is 2.0 and the inlet temperature to the reactor is 675° F. Oxygen is fed as air at a rate of 0.70 mol per mol of the hydrocarbon mixture.

I claim:
1. A process for dehydrogenating organic compounds which comprises (1) feeding oxygen and an organic compound to be dehydrogenated to a dehydrogenation zone to form a dehydrogenation zone effluent comprising unsaturated organic compound and noncondensable gases, (2) cooling the dehydrogenation zone effluent in a cooling zone, (3) compressing the cooled effluent in a compression zone, (4) absorbing the compressed effluent in an oil absorber to absorb the unsaturated organic compound in the oil and release an absorber overhead gas, and (5) feeding the said absorber overhead gas to the zone between the said cooling zone and the suction side of the said compression zone in response to the rate of flow of oxygen to the said dehydrogenation zone.

2. The method of claim 1 wherein the said organic compound is a hydrocarbon of 2 to 12 carbon atoms.

3. The method of claim 1 wherein the said organic compound is an acyclic hydrocarbon of 4 to 5 carbon atoms having a straight chain of at least 4 carbon atoms.

4. The method according to claim 1 wherein the oxygen is supplied to the dehydrogenation zone by air or air enriched with oxygen.

5. The method of claim 1 wherein the said dehydrogenation zone effluent comprises butadiene-1,3.

6. The method of claim 1 wherein the said organic compound is selected from the group consisting of n-butane, n-butene and mixtures thereof.

7. The method of claim 1 wherein the oxygen being fed to the dehydrogenation zone is diminished in response to a decrease in the flow to the dehydrogenation zone of the organic compound to be dehydrogenated.

References Cited

UNITED STATES PATENTS

| | | | |
|---|---|---|---|
| 2,906,791 | 9/1959 | Baumann et al. | 260—680 |
| 3,012,082 | 12/1961 | Kelly et al. | 260—680 |
| 3,200,166 | 8/1965 | Bojanowski. | |
| 3,205,279 | 9/1965 | Pratt et al. | 260—680 |

PAUL M. COUGHLAN, JR., Primary Examiner

U.S. Cl. X.R.

260—696